United States Patent
Nica (10) Patent No.: US 9,781,079 B2
(45) Date of Patent: *Oct. 3, 2017

(54) SECURITY KEY GENERATOR

(71) Applicant: Elvis Gabriel Nica, Bucharest (RO)

(72) Inventor: Elvis Gabriel Nica, Bucharest (RO)

(73) Assignee: NXP USA, Inc., Austin, TX (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/611,856

(22) Filed: Feb. 2, 2015

(65) Prior Publication Data

US 2015/0156179 A1    Jun. 4, 2015

Related U.S. Application Data

(62) Division of application No. 13/057,384, filed as application No. PCT/IB2008/053355 on Aug. 21, 2008, now Pat. No. 8,948,387.

(51) Int. Cl.
*H04L 29/06* (2006.01)
*H04W 12/04* (2009.01)
(Continued)

(52) U.S. Cl.
CPC ............ *H04L 63/0428* (2013.01); *G09C 1/00* (2013.01); *H04L 9/0875* (2013.01); *H04L 63/06* (2013.01); *H04L 63/061* (2013.01); *H04W 12/04* (2013.01); *H04L 2209/12* (2013.01); *H04L 2209/80* (2013.01)

(58) Field of Classification Search
CPC ... H04L 63/0428; H04L 63/06; H04L 63/061; H04L 9/0875; H04W 12/04
See application file for complete search history.

(56) References Cited

U.S. PATENT DOCUMENTS 6,031,913 A * 2/2000 Hassan ............... H04L 9/0838
380/44
2007/0036353 A1    2/2007 Reznik et al.

FOREIGN PATENT DOCUMENTS

WO    96/23376 A2    8/1996
WO    97/49213 A1    12/1997

OTHER PUBLICATIONS

Tang et al. "Channel Characterization and Link Quality Assessment of IEEE 802.15.4—Compliant Radio for Factory Environments", IEEE Transactions on Industrial Informatics, vol. 3, No. 2, May 2007.*

(Continued)

*Primary Examiner* — Noura Zoubair (57) ABSTRACT

A communication system has a first and a second communicating device operable to send and receive data units through a communication channel. Some of the data are encrypted using a security key. The first device comprises a first key generator generating a first embodiment of the key independently of a second embodiment of the key generated by a second generator of the second device, the second embodiment being generated independently of the first, which depends on parameter(s) characterizing a first transmission quality of the channel when receiving a first set of unencrypted data sent by the second device. The second embodiment depends on parameter(s) characterizing a second transmission quality of the channel when receiving a second set of unencrypted data sent by the first device, the first set being different from the second set.

18 Claims, 5 Drawing Sheets

(51) Int. Cl.
*G09C 1/00* (2006.01)
*H04L 9/08* (2006.01)

(56) References Cited

OTHER PUBLICATIONS

Aona et al.; "Wireless Secret Key Generation Exploiting Reactance-Domain Scalar Response of Multipath Fading Channels"; IEEE Transactions on Antennas and Propagation; IEEE Service Center, Piscataway, NJ, US; vol. 53, No. 11; Nov. 1, 2005; pp. 3776-3784.
Anonymous; "Extract from IEEE 802.15.4-2006 (Revision of IEEE 802.15.4-2003)—Part 15.4: Wireless Medium Access Control (MAC) and Physical Layer (PHY) Specifications for Low-Rate Wireless Personal Area Networks (WPANs)"; IEEE Standard 802.15.4-2006; IEEE; New York, US; Sep. 8, 2006; Pates, 1, 65, 172-176, and 217.
Tang et al.; "Channel Characterization and Link Quality Assessment of IEEE 802.15.4—Compliant Radio for Factory Environments"; IEEE Transactions on Industrial Informatics; vol. 3, No. 2; May 2007.
Non-final Office Action dated Feb. 2, 2013 in U.S. Appl. No. 13/057,384; 16 Pages.
Final Office Action dated Jul. 11, 2013 in U.S. Appl. No. 13/057,384; 30 Pages.
Non-final Office Action dated Oct. 31, 2013 in U.S. Appl. No. 13/057,384; 20 Pages.
Final Office Action dated Apr. 4, 2014 in U.S. Appl. No. 13/057,384; 23 Pages.
Notice of Allowance dated Sep. 19, 2014 in U.S. Appl. No. 13/057,384; 15 Pages.
International Search Report dated Aug. 25, 2009 for International Application No. PCT/IB2008/053355, 3 pages.

\* cited by examiner

SECURITY KEY GENERATOR

CROSS-REFERENCE TO RELATED APPLICATION(S)

This application is a divisional of U.S. patent application Ser. No. 13/057,384, entitled "Security Key Generator," filed on Feb. 3, 2011, which is a National Stage Entry under 37 C.F.R. §371 of PCT/IB2008/053355, filed Aug. 21, 2008, the disclosures of which are hereby expressly incorporated by reference in their entirety.

FIELD OF THE INVENTION

This invention in general relates to data encryption and more precisely to a communication system using a security key generation allowing secure encrypted communication through a communication channel and a method of establishing a secure communication.

BACKGROUND OF THE INVENTION

A secure communication system provides users of the system with the facility of confidential information transmission over a communication channel, such as a wireless or a wired communication channel, with reduced danger of successful eavesdropping or interception. Message integrity checking, sender/receiver identity authentication, digital signatures are other examples, where a secure communication system is required. A common way of providing a secure information transmission is encryption, i.e. usage of an algorithm for transforming information prior to transmission into a representation that allows retrieval of the contained information only by those possessing special knowledge, which is referred to as a key. Besides security aspects, data encryption provides a way of transmission error detection. Furthermore, digital data encryption is closely related to multiplexing technologies, such as code division multiple access (CDMA), for establishing several digital communication links over the same physical channel.

Digital data encryption is usually achieved using either a symmetric key cryptography or an asymmetric or public key cryptography approach. Symmetric key methods, such as those according to the Data Encryption Standard (DES) or the Advanced Encryption Standard (AES), refer to encryption methods in which both the sender and receiver share the same key for encryption and decryption of information (or in which their keys are different, but related in an easily computable way). Public key methods, such as the Diffie-Hellman method or the RSA-method, use two different but mathematically related keys. Calculation of a private key is computationally infeasible from a public key. Algorithms for creating a public key are often based on computationally complex problems from number theory, such as integer factorization or discrete logarithm calculation.

If two users of a communication system have not agreed to share a symmetric key for secure data transmission in advance, the key must be transmitted over the communication channel before a secure communication has been established. During transmission, the key might be intercepted, copied or changed. Alternatively, the key must be shared using a different way of communication, which inhibits secure real time communication and is a source of additional errors. Asymmetric key systems require a user to generate a random quantity and require a certain amount of information to be exchanged and require suitable computational resources in order to handle the complexity of the algorithm.

SUMMARY OF THE INVENTION

The present invention provides a communication system and a method of establishing a secure communication as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Identical reference numerals in different figures refer to identical or similar components.

DETAILED DESCRIPTION OF THE PREFERRED EMBODIMENTS

Figure 1:
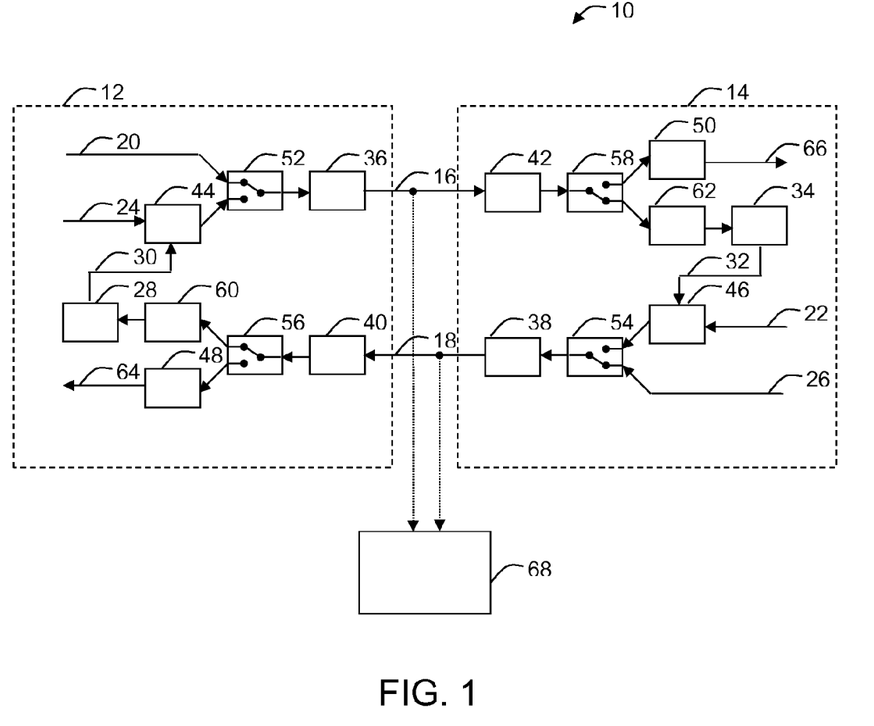
FIG. 1 schematically shows a block diagram of an example of an embodiment of a communication system.

Referring to FIG. 1, a block diagram of an example of an embodiment of a communication system 10 is shown, having a first 12 and a second 14 communicating device operable to send and receive a plurality of data units 20, 22, 24, 26 through a communication channel 16, 18, the plurality of data units comprising data units encrypted using a security key, the first device comprising a first security key generator 28 generating a first embodiment 30 of the key independently of a second embodiment 32 of the key generated by a second security key generator 34 of the second device, the second embodiment being generated independently of the first embodiment, the first embodiment depending on one or more parameters characterizing a first transmission quality of the communication channel 18 when receiving a first set of data units 26 sent by the second device not encrypted using the key, the second embodiment depending on one or more parameters characterizing a second transmission quality of the communication channel when receiving a second set of data units 20 sent by the first device not encrypted by the key, the first set being different from the second set. The first device 12 is set up to send the second set 20 of unencrypted data units to the corresponding second device 14 and to receive the first set 26 of unencrypted data units from the corresponding device 14 and to generate a security key based on at least one parameter describing the transmission quality during reception of the unencrypted data units sent by the corresponding device 14 when in key generation mode. Transmission quality parameter extraction may be performed by an analysis module 60, 62, that delivers extracted parameter information to a security key generator module 28, 34. However, functionality of analysis module may be implemented as part of the security key generation module 28, 34 or the receiver module 40, 42. Each set 20, 26 of unencrypted data comprises at least one data unit. However, regardless of the size of the first set and the second set, set one and set two do not need to consist of the same data units to be sent over the channel 16, 18 in identical order. The described system is independent from a correlation of the content of the first and the second set of data units. In order to reduce detection of a connection establishment sequence by a sniffer 68 and to avoid exchanging information about the content of set one and set two, completely different first and second sets 20, 26 may be used for transmission during key generation phase. After the key has been generated by security key generator 28, 34, the device 12 is set up to switch to a secure communication mode and encrypt data units 24 to be sent over the channel 16 using the security key 30 generated during the key generation phase and to receive data units 22 encrypted and sent by the corresponding device 14 and perform a decryption using the generated key. Decryption is the successful extraction of the original information contained in the encrypted data signal. Switching from key generation mode to secure communication mode may be implemented using switches 52, 54, 56, 58, as shown in FIG. 1. However, any other device or procedure for changing the mode of operation may be used. For example, a protocol controlling communication between the two devices 12, 14 may comprise sending a signal for changing the mode of operation from key generation mode to secure communication mode, or after a certain number of link quality recordings, devices will stop transmitting unencrypted data units and change to secure communication mode. Each device 12, 14 comprises a security key generator 28, 34 and may comprise a transmitter 36, 38 for sending and a receiver 40, 42 for receiving encrypted and unencrypted data units through the communication channel 16, 18. In order to create encrypted and decrypted data units using the security key, each device may contain an encoder or encrypter 44, 46 and a decoder or decrypter 48, 50. Decrypter 48, 50 finally provides securely transmitted decrypted data units 64, 66 containing the same information as the original data units 22, 24 before encryption and secure transmission. A data unit is a signal containing information to be exchanged between the communicating devices. The information may be a single bit. A data unit may also be a data packet containing more than one bit of information. When in key generation mode, each of the devices creates an embodiment 30, 32 of the security key. The security key is not known to the device 12, 14 in advance. Moreover, each device 12, 14 independently creates its own security key.

Independently in this context is to be understood as without knowledge about the embodiment of the security key generated by the corresponding device. However, due to the chosen source of information used to create the key, i.e. parameter values describing the transmission quality, both devices will create security keys, that will be identical or very similar embodiments of the same key. Encryption and decryption algorithms may be used that are tolerant against small erroneous differences of key embodiments.

The first security key generator 28 may generate the first embodiment 30 of the key depending on a variation of at least one of the parameters characterizing the first transmission quality and the second security key generator 34 may generate the second embodiment 32 of the key depending on a variation of at least one of the parameters characterizing the second transmission quality. Even if signals sent over the communication channel 16, 18 in one direction encounter different changes due to, for example, different attenuation, noise, interference etc., than signals sent in the other direction, the variation of the parameter over time may still be very similar.

A parameter used for key generation may be any parameter describing the transmission quality of the channel 16, 18 during reception of data units. It may, for example, be a received signal-to-noise ratio, frequency shift, received signal power, received noise power, bit error rate, attenuation, etc. It may also be a derived parameter combining any or all of these parameters. For example, the parameter values may be link quality indication (LQI) values. LQI is a parameter defined by IEEE 802.15.4 and characterizes the quality of a received signal. It can be the received power, the estimated signal-to-noise-ratio (SNR) or a combination of both. IEEE 802.15.4 is a standard which specifies the physical layer and medium access control for low-rate wireless personal area networks (LR-WPANs). A personal area network (PAN) is a network used for communication among computer devices, including, for example, telephones and personal digital assistants. It may also be used, for example, for communication between electronic devices, such as a television set and a remote control. Bluetooth or ZigBee devices may use physical layer and medium access control layer as defined by IEEE 802.15.4, requiring no or only very little user interaction when setting up the network. The described system is operable to set up a secure communication with no or only very limited human interaction. It does not involve exchanging secret information over the communication channel, a previously shared secret between the communicating devices or the user entering information in the devices for establishing a secure connection.

Wireless data networks, such as the WPANs mentioned above or wireless local area networks (WLAN), can easily be subject to eavesdropping or interception, since there is no exclusive physical link between communicating devices and it is easy for a third device to receive the signals send between communicating devices. Hence, secure encrypted communication may be desired between devices 12, 14 communicating over a wireless channel. Therefore, the communication channel 16, 18 of the communication system 10 described here may be a wireless communication channel. However, the communication channel 10 may also be a wired communication channel, such as a fibre glass or copper wire connection used for ISDN or DSL communication or a wired telephone connection.

Figure 2:
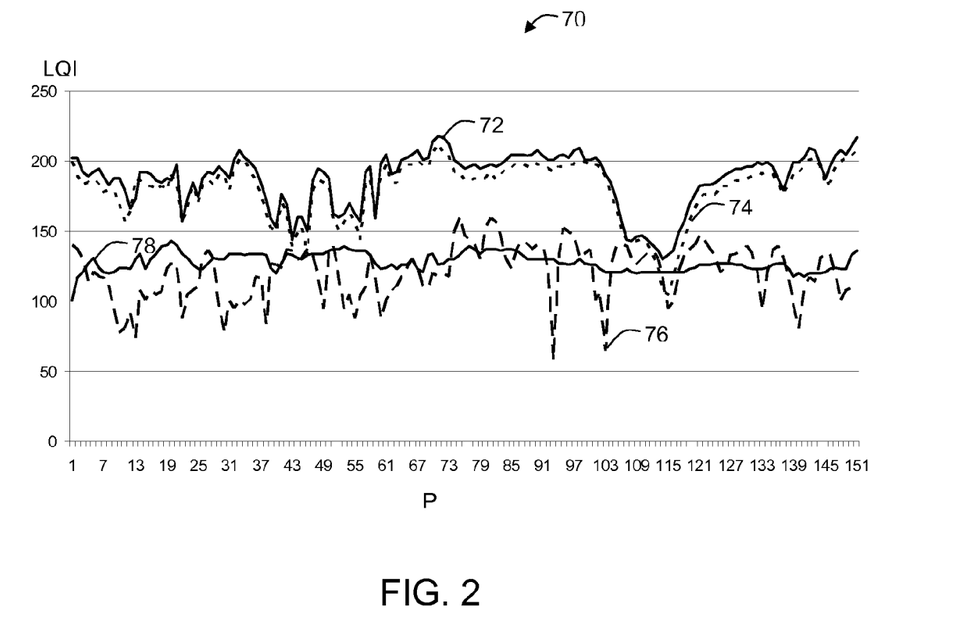
FIG. 2 schematically shows a first diagram of link quality estimator values vs. packet numbers for an example of an embodiment of a communication system as shown in FIG. 1.

Referring now also to FIG. 2, a diagram 70 of link quality estimator (LQI) values vs. packet numbers (P) for an example of an embodiment of a communication system as shown in FIG. 1 is illustrated. The example communication system is a wireless LR-WPAN having two communicating devices 12, 14 and a sniffer 68 trying eavesdropping of the communication. A packet is a data unit comprising a plurality of single information bits. The diagram shows the LQI captured for the packets transmitted by device one 12 as received by device two 14 and the sniffer 68. It also shows the LQI captured for the packets transmitted by device two and the sniffer. It can be seen that correlation between LQIs measured by device one 72 and device two 74 is very high, whereas correlation with LQIs measured by the sniffer 76, 78 is very low. Therefore, the sniffer will not be able to generate an embodiment of a suitable key corresponding to those 30, 32 generated by device one and device two, even if the algorithm of calculating the key used by the communicating devices 12, 14 is known to the sniffer 68. On the other hand, the first and second device can generate identical or very similar embodiments 30, 32 of the key to be used for a secure communication without exchanging information about their key generation.

Figure 3:
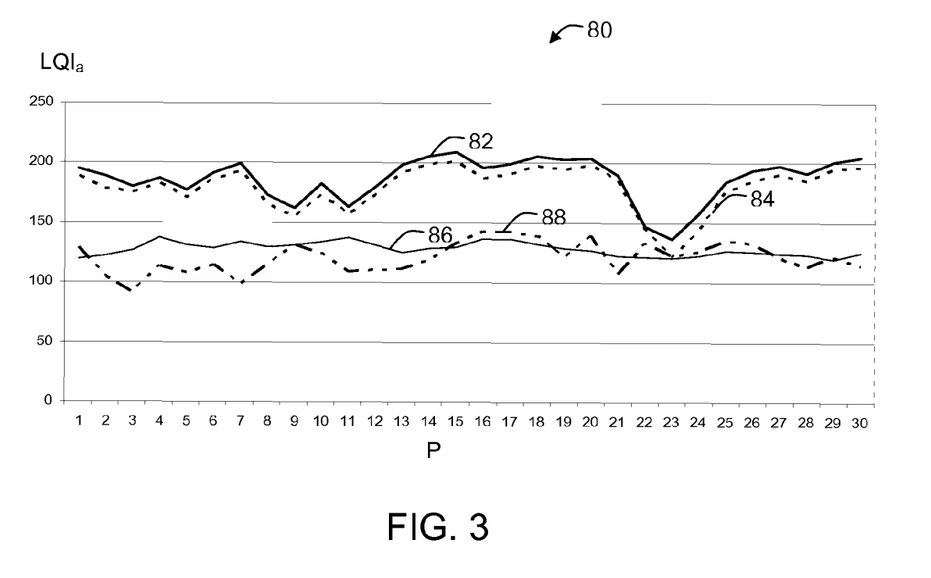
FIG. 3 schematically shows a second diagram of link quality estimator values vs. packet numbers for an example of an embodiment of a communication system as shown in FIG. 1.

Referring now also to FIG. 3, a second diagram 80 of link quality estimator values ($LQI_a$) vs. packet numbers (P) for an example of an embodiment as shown in FIG. 1 is illustrated. The security key generator used for generating the shown example values averages every five consecutive LQIs. Other averages are possible. Averaging consecutive LQIs may result in a low-pass filtered plot of link quality estimator values and a higher correlation between LQIs captured for the packets transmitted by device one and received by device two 82 and transmitted by device two and received by device one 84, compared to those received by the sniffer 86, 88. Other signal analysis and filtering methods may be applied to the received values for minimization of errors and improved results, for example Fourier analysis or Wiener filtering.

The first and the second security key generator 28, 34 may each additionally generate an embodiment of an additional security key, the additional security key being used for decrypting received data units encrypted by the security key. The described system is not restricted to using the same key for encryption and decryption of data units. Different keys may be generated based on a mathematical relation between the encryption key and the decryption key. It may also be possible to have the second device 14 generate completely different keys from those generated by the first device 12, as long as a mathematical rule is known for decrypting data encrypted with a completely different key, such as used in known asymmetric key systems.

The described communication system 10 may be used for secure communication between more than two communicating devices 12, 14. The communication system may comprise at least one further communicating device operable to communicate with the first 12 and/or the second 14 communicating device. This may be achieved by generating security keys for any communication link between devices. For point-to-multipoint communication, i.e. communication of a plurality of devices with one first device, the same or similar security key may be generated by all communicating devices.

Creation of a complex security key is achieved by evaluating different values of transmission quality parameter(s). Therefore, a physical parameter of the communication channel 16, 18 may be changed at least once during transmission of the first 26 and second 20 set of data units not encrypted using the security key. For a wired communication system, this may be achieved, for example, by varying a link capacitance, resistance and/or inductance. Wireless communication channels are easily subject to variation of their physical parameters, for example by changing environment, signal reflections and fading, interference with other transmitting devices etc. Therefore, at least one of the devices 12, 14 may be moved at least once during transmission of the first 26 and second 20 set of data units not encrypted using the security key. This intentional change of link-quality enables the security key generation to rely on the variation of link quality rather than absolute values of link quality parameters, even if the channel is not subject to continuous changes. Hence, the variation of link quality induced by the movement of at least one of the devices or by changing the physical environment between the devices may be used for key generation. Furthermore, the usage of the transmission channel itself may induce a variation of the transmission quality parameters.

The sets 20, 26 of unencrypted data units used for measuring the transmission quality parameters, may be exchanged one after another between devices. However, depending on the transmission time of data units between devices, changes of transmission quality may be fast. Therefore, data units of the first set and the second set may be sent alternately by the first 12 and second 14 device, reducing time for significant change of channel quality as measured by device one and device two. However, if frequency of sending and receiving data units is high, for example 20 data units per second, compared to the change of transmission quality, the measured change of transmission quality may not depend strongly on the instant change of transmission quality and therefore, device one and device two may be able to measure a similar variation. A secure key consists of, for example, 128 bits. For generating a key of 128 bits, an example embodiment of the system may evaluate about 200 link quality estimation values. If about 70 data units are exchanged during key generation phase, the security key generator may need about 2 to 3 seconds for generating a 128 bit key. However, other implementations of the security key generator and the communication system may require less or more data and computation effort for generating a security key.

The communication system may allow sending useful information between device one and device two during security key generation, given that the transmitted information does not require security protection. However, the first set 26 and the second set 20 of data units may be sets of dummy data units, i.e. the information transmitted with these data units may not be required for establishing a secure communication, and only the quality of the received signals after transmission may be evaluated.

After creating the security keys, the first device 12 may send a message to the second device 14, encrypted using the generated first embodiment 30 of the key. If the second device 14 succeeds with decrypting the message using the generated second embodiment 32 of the key, it may reply to the first device 12 with a second message encrypted using the second embodiment 32 of the key. If the first device 12 succeeds with decrypting the second message using the first embodiment 30 of the key, device one is aware that a secure link has been established and may send a confirmation to the second device 14 or immediately start with transmitting encrypted data. If this procedure fails, security key generation may be repeated.

Figure 4:
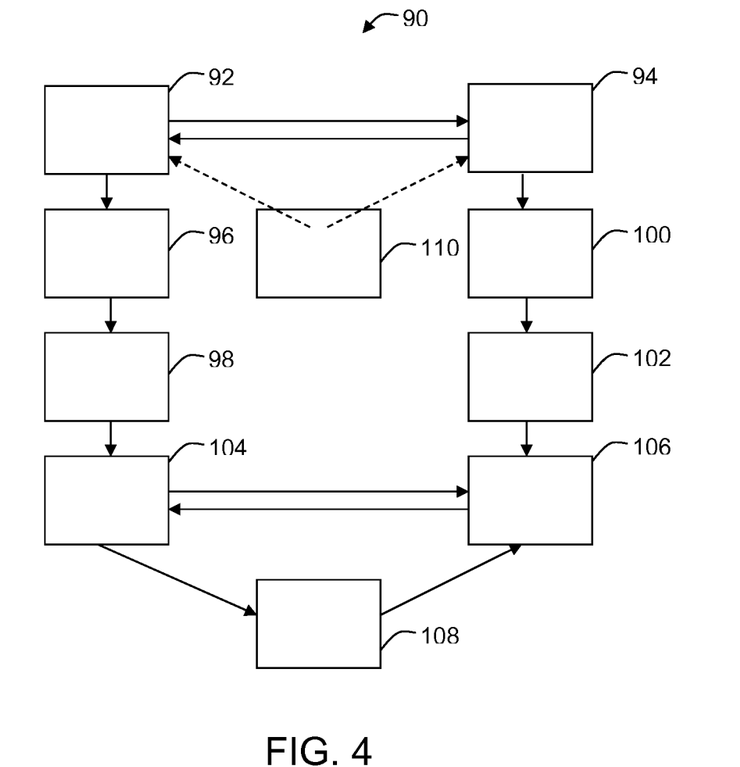
FIG. 4 schematically shows a flow diagram of an example of an embodiment of a method of establishing a secure communication.

Referring now also to FIG. 4, a flow diagram of an example of a first embodiment of a method 90 of establishing a secure communication is illustrated. A method of establishing a secure communication between a first 12 and a second 14 communicating device operable to send and receive a plurality of data units 20, 22, 24, 26 through a communication channel 16, 18 is shown, comprising sending 92 a first set 26 of data units not encrypted by a security key from the second device 14 to the first device 12; sending 94 a second set 20 of data units not encrypted by the security key from the first device 12 to the second device 14, the second set 20 of data units being different from the first set 26 of data units; extracting 96 a first set of values of one or more parameters characterizing a first transmission quality of the communication channel 18 when receiving the first set 26 of data units; generating 98 a first embodiment 30 of a security key depending on the first set of extracted values, independently of a second embodiment 32 of the security key, extracting 100 a second set of values of one or more parameters characterizing a second transmission quality of the communication channel 16 when receiving the second set 20 of data units; and generating 102 the second embodiment 32 of the security key depending on the second set of extracted values. During exchange of unencrypted data units, parameter values describing the transmission quality may be recorded. Evaluation of the recorded transmission quality values and security key generation may be carried out after reception of the first and second set, respectively. Alternatively, key generation may be carried out during reception of unencrypted data units and subsequently updated with every received data unit of the respective data set, i.e. data units are continuously exchanged between devices, and the link quality is measured for every data unit received.

In order to signal establishment of a secure link, the described method may additionally comprise sending 104 at least one data unit encrypted using the first embodiment 30 of the security key from the first device 12 to the second device 14; decrypting 106 the at least one data unit encrypted using the first embodiment 30 of the security key and sending at least one data unit encrypted using the second embodiment 32 of the security key from the second device 14 to the first device 12; decrypting 108 the at least one data unit encrypted using the second embodiment 32 of the security key and sending a valid key confirmation from the first device 12 to the second device 14. Valid key confirmation and any data units sent subsequently, may be sent encrypted using the generated security key. The method may also comprise changing 110 a physical parameter of the communication channel 16, 18 at least once during transmission of the first 26 and second 20 set of data units not encrypted using the security key. The described method allows implementing the advantages and characteristics of the described communication system as part of a method for establishing a secure communication between a first and a second communicating device. However, as described above, more than two devices may be used.

Figure 5:
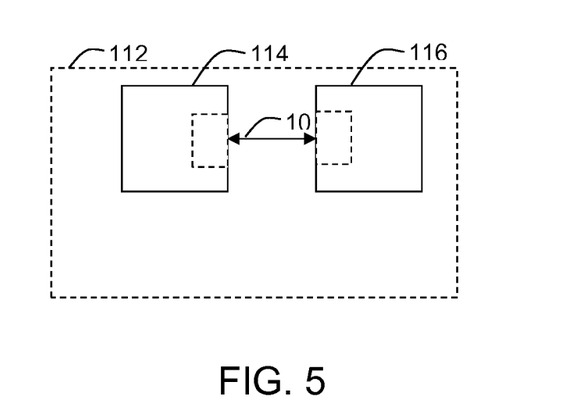
FIG. 5 schematically shows a block diagram of an example of an embodiment of an electronic apparatus.

Referring now also to FIG. 5, a block diagram of an example of an embodiment of an electronic apparatus 112 is shown, having at least two communicating devices 114, 116, comprising a communication system 10 or using a method 90 of establishing a secure communication as described above. For example, the electronic apparatus 112 may be any consumer electronic apparatus, such as a television set or hi-fi system, using a remote control. It may for example be any apparatus based on the IEEE 802.15 standard or any other standard for defining data communication between two devices. And the described communication system and method may also be used for communication between a plurality of electronic apparatus. The apparatus may also be, for example, a Bluetooth application, online payment or shopping system using, for example, EC-Net remote controls, a RF4CE (radio frequency for consumer electronic) application, e.g. using a remote control, or any consumer electronic or network layer solution for wireless and wired networks.

A computer program product may comprise code portions for executing steps of a method 90 of establishing a secure communication or for implementing parts of a communication system 10 as described above when run on a programmable apparatus.

An operating system (OS) is the software that manages the sharing of the resources of a computer and provides programmers with an interface used to access those resources. An operating system processes system data and user input, and responds by allocating and managing tasks and internal system resources as a service to users and programs of the system.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary signal processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media such as memory 35 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. A communication system having a first and a second communicating device operable to send and receive a plurality of data units through a communication channel, said plurality of data units comprising data units encrypted using a security key, said first device comprising a first security key generator generating a first embodiment of said security key independently of a second embodiment of said security key generated by a second security key generator of said second device, said second embodiment being generated independently of said first embodiment, said first embodiment depending on one or more parameters characterizing a first transmission quality of said communication channel when receiving a first set of data units sent by said second device not encrypted using said security key, said second embodiment depending on one or more parameters characterizing a second transmission quality of said communication channel when receiving a second set of data units sent by said first device not encrypted by said security key, said first set, as transmitted, including different content from second set, as transmitted, wherein at least one of the first and second communicating devices is moved at least once during the receiving of the first and second sets of data units, wherein said communication channel is a wired communication channel, and wherein a physical parameter of said communication channel is changed at least once during transmission of said first and second set of data units not encrypted using said security key, wherein said physical parameter comprises a link capacitance, wherein said first and second security key generators additionally generate respective embodiments of an additional security key at said first device and said second device, wherein said respective embodiments of said additional security key are different from said first embodiment and said second embodiment of the security key, a respective embodiment of said additional security key being used for decrypting received data units encrypted by the first embodiment of the security key, said first device sending a valid key confirmation to said second device, wherein the valid key confirmation is encrypted using said first embodiment of the security key.

2. The communication system as claimed in claim 1, wherein said first security key generator generates said first embodiment of said key depending on a variation of at least one parameter characterizing said first transmission quality and said second security key generator generates said second embodiment of said key depending on a variation of at least one parameter characterizing said second transmission quality.

3. The communication system as claimed in claim 1, wherein said one or more parameters are link quality indication (LQI) values.

4. The communication system as claimed in claim 1, wherein at least one of said devices is moved at least once during transmission of said first and second set of data units not encrypted using said security key.

5. The communication system as claimed in claim 1, wherein said security key comprises a public key and said additional security key comprises a private key.

6. The communication system as claimed in claim 1, comprising at least one further communicating device operable to communicate with said first and/or said second communicating device.

7. The communication system as claimed in claim 1, wherein a physical parameter of said communication channel is changed at least once during transmission of said first and second set of data units not encrypted using said security key, wherein said physical parameter further comprises at least one of a link resistance and a link inductance.

8. The communication system as claimed in claim 1, wherein data units of said first set and said second set are sent alternately by said first and said second device.

9. The communication system as claimed in claim 1, wherein said first set and said second set of data units are sets of dummy data units.

10. A method of establishing a secure communication between a first and a second communicating device operable to send and receive a plurality of data units through a communication channel, comprising sending a first set of data units not encrypted by a security key from said second device to said first device; sending a second set of data units not encrypted by said security key from said first device to said second device, said second set of data units, as sent, including different content from said first set of data units, as sent, wherein at least one of the first and second communicating devices is moved at least once during transmission of the first and second sets of data units; extracting a first set of values of one or more parameters characterizing a first transmission quality of said communication channel when receiving said first set of data units; generating a first embodiment of said security key depending on said first set of extracted values, independently of a second embodiment of said security key, extracting a second set of values of one or more parameters characterizing a second transmission quality of said communication channel when receiving said second set of data units; generating said second embodiment of said security key depending on said second set of extracted values; additionally generating respective embodiments of an additional security key at said first device and said second device, wherein said respective embodiments of said additional security key are different from said first embodiment and said second embodiment of the security key, a first embodiment of said additional security key being used for decrypting received data units encrypted by the first embodiment of the security key; and sending a valid key confirmation from the first device to the second device, wherein the valid key confirmation is encrypted using the first embodiment of the security key, wherein a physical parameter of said communication channel is changed at least one during transmission of said first and second set of data units not encrypted using said security key.

11. The method as claimed in claim 10, comprising
sending at least one data unit encrypted using said first embodiment of said security key from said first device to said second device;
decrypting said at least one data unit encrypted using said first embodiment of said security key and sending at least one data unit encrypted using said second embodiment of said security key from said second device to said first device;
decrypting said at least one data unit encrypted using said second embodiment of said security key and sending a valid key confirmation from said first device to said second device.

12. The method as claimed in claim 10, comprising:
changing a physical parameter of said communication channel at least once during transmission of said first and second set of data units not encrypted using said security key, wherein said communication channel is a wired communication channel, and wherein said physical parameter comprises a link resistance, wherein said physical parameter further comprises at least one of a link capacitance and a link inductance.

13. A communication system having a first and a second communicating device operable to send and receive a plurality of data units through a communication channel, said plurality of data units comprising data units encrypted using a security key, said first device comprising a first security key generator generating a first embodiment of said security key independently of a second embodiment of said security key generated by a second security key generator of said second device, said second embodiment being generated independently of said first embodiment, said first embodiment depending on one or more parameters characterizing a first transmission quality of said communication channel when receiving a first set of data units sent by said second device not encrypted using said security key, said second embodiment depending on one or more parameters characterizing a second transmission quality of said communication channel when receiving a second set of data units sent by said first device not encrypted by said security key, said first set, as transmitted, including different content from said second set, as transmitted, wherein at least one of the first and second communicating devices is moved at least once during the receiving of the first and second sets of data units, wherein variation of link quality induced by movement of at least one of the first and second communicating devices is used for key generation, wherein changing a physical parameter between the first and second communicating devices is used for key generation, wherein said communication channel is a wired communication channel, and wherein said physical parameter comprises a link inductance, and wherein said first and second security key generators additionally generate respective embodiments of an additional security key at said first device and said second device, wherein said respective embodiments of said additional security key are different from said first embodiment and said second embodiment of the security key, a respective embodiment of said additional security key being used for decrypting received data units encrypted by the first embodiment of the security key, said first device sending a valid key confirmation to said second device, wherein the valid key confirmation is encrypted using said first embodiment of the security key.

14. The communication system of claim 13 wherein changing a physical parameter between the first and second communicating devices is used for key generation, wherein said communication channel is a wired communication channel, and wherein said physical parameter comprises at least one of a link capacitance and a link resistance.

15. The communication system of claim 13 wherein usage of the communication channel induces a variation of the one or more parameters characterizing the first transmission quality and the one or more parameters characterizing the second transmission quality.

16. The communication system of claim 13 wherein the variation of link quality is a relative variation rather than an absolute value of a link quality parameter.

17. The communication system of claim 1, said first embodiment further depending on a numerical average of one of the one or more parameters characterizing a first transmission quality, and said second embodiment further depending on a numerical average of one of the one or more parameters characterizing a second transmission quality.

18. The communication system of claim 1, said first embodiment further depending on one of a Fourier analysis or a Wiener filtering of one of the one or more parameters characterizing a first transmission quality, and said second embodiment further depending on one of a Fourier analysis or a Wiener filtering of one of the one or more parameters characterizing a second transmission quality.

* * * * *